US006663676B1

(12) United States Patent
El A'mma et al.

(10) Patent No.: US 6,663,676 B1
(45) Date of Patent: Dec. 16, 2003

(54) PREPARATION OF AN AQUEOUS COMPOSITION FOR TREATING LEATHER

(75) Inventors: Anton Georges El A'mma, Perkiomenville, PA (US); Monika Ulrike Fritsche, Horsham, PA (US); James John Hodder, Dolyestown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 380 days.

(21) Appl. No.: 09/692,085

(22) Filed: Oct. 19, 2000

Related U.S. Application Data

(60) Provisional application No. 60/161,396, filed on Oct. 25, 1999.

(51) Int. Cl.[7] ............................ A61C 17/00; C14C 1/00

(52) U.S. Cl. ............................ 8/94.1; 8/94.15; 8/94.19

(58) Field of Search ......................... 8/94.1, 161, 94.15

(56) References Cited

U.S. PATENT DOCUMENTS 4,208,184 A 6/1980 Nowak et al. ............... 8/94.23
4,314,800 A * 2/1982 Monsheimer et al. ......... 8/94.1
4,732,968 A 3/1988 Obayashi et al. ........... 528/490
4,750,906 A 6/1988 Schmidt ..................... 8/94.18
5,648,116 A * 7/1997 Roe et al. ................... 427/136
6,207,780 B1 * 3/2001 Stockhausen et al. ....... 526/287

FOREIGN PATENT DOCUMENTS

DE 19513989 A 4/1995
ZA 9711432 12/1997

OTHER PUBLICATIONS

European Patent Office Search Report for EP Patent Application 00309149.3–2109–dated Feb. 13, 2001.

* cited by examiner

*Primary Examiner*—Yogendra N. Gupta
*Assistant Examiner*—Preeti Kumar
(74) *Attorney, Agent, or Firm*—Gary D. Greenblatt

(57) ABSTRACT

A method of preparing an aqueous composition for treating leather comprises adding a predetermined amount of a solid particulate leather treatment composition directly into a predetermined amount of water in a vessel at a tannery; and dissolving or dispersing said solid particulate composition in said water. The solid particulate composition comprises 0.1 wt % or more based on the total weight of said particulate composition of a particulate hygroscopic material. The solid particulate composition is non-dusting in humid atmospheres.

7 Claims, No Drawings

PREPARATION OF AN AQUEOUS COMPOSITION FOR TREATING LEATHER

CROSS REFERENCE TO RELATED PATENT APPLICATIONS

This is a non-provisional application of prior U.S. provisional application Ser. No. 60/161,396 filed Oct. 25, 1999.

This invention is concerned with a process for the preparation of an aqueous composition for treating leather. In particular, this invention concerns a process involving the use of hygroscopic particles.

Leather processors involved with the wet end treatment of leathers tend to prefer the chemicals used in their tanneries, particularly the more hazardous chemicals, to be supplied from the manufacturers in a liquid format, such as a solution, suspension, dispersion or emulsion, rather than in a solid format, such as a powder. The reason for this is derived from the problems associated with handling hazardous chemicals in confined environments: liquids do not suffer the dusting problems associated with powders. Indeed, it is the dusting issue which is of increasing concern to the leather processors and formulators, as the presence of even a low quantity of dust in the atmosphere of a factory may provide a health risk to workers or pose a combustion risk.

Although supplying chemicals in a liquid format overcomes the dusting problem, liquids can be more expensive to transport than chemicals in a solid format.

Though many powdered products currently supplied to the leather processors are dusting, such as phenolic retanning agents, it is expected that health and safety legislation in many countries may soon force leather processors to reduce worker exposures to dusting materials.

Some powdered products, such as dyes, include an anti-dusting aid/agent, such as a mineral oil, to render the powders non-dusting. However, because the anti-dusting oil is included into the tanning mill with the powdered dye, the resultant leathers become impregnated with the anti-dusting oil. Anti-dusting oil in dyestuffs and other solid additives is a major contributor to fogging, a particularly detrimental characteristic in an automotive or aircraft leather.

South African patent application 9711432 discloses compositions for the simultaneous retanning and fatliquoring of pretanned leather pelts. The compositions are presented in such a form that they give a homogeneous mixture when added to at least 8 times the amount of water at from 10 to 60° C. The compositions are preferably in the form of a solid, but may also be in the form of a solution, dispersion or emulsion. The compositions are disclosed to be non-dusting. This non-dusting property is believed to derive from the presence in the composition of the fatliquoring agent. Fatliquoring agents are fatty, oily or waxy in nature, so have inherently a dust-suppressing effect on the disclosed solid retanning agents. Since the compositions are manufactured by the supplier prior to delivery to the tannery, the supplier has in effect fixed the relative concentrations of retanning and fatliquoring components of the solid composition, thereby limiting the leather processor from varying the concentrations of these components at the tannery. Whilst this may be acceptable to some leather processors, leather processors generally prefer to retain their freedom to vary the retanning and fatliquoring component concentrations themselves, thereby to give them opportunity to change processing conditions, for example when different reaction conditions are required to produce a different effect on the finished leather, or when the quality or type of leather to be treated is changed and different reaction conditions are required to produce the same effect on the finished leather. There is no disclosure or suggestion in the South African patent application that a retanning agent may be supplied in a solid format optionally in the absence of a fatliquoring agent.

Homopolymers of acrylic acid (polyacrylic acid), copolymers comprising more than 50 wt % polymerised acrylic acid, and basic salts thereof, herein individually and jointly referred to as polymers of acrylic acid, have been used for many years in the wet end treatment of leathers as retanning agents. Such retanning agents have always been supplied to leather processors in a liquid format: polyacrylic acid is soluble in water, so retanning agents based on polyacrylic acid are supplied to leather processors as aqueous solutions; copolymers comprising more than 50 wt % polymerised acrylic acid may be soluble or insoluble in water so, depending upon the hydrophobicity of the polymerised co-monomer(s) and/or the extent of neutralization, have always been supplied to leather processors as aqueous solutions or aqueous suspensions, dispersions or emulsions.

It is an object of the present invention to provide a process for rendering solid leather processing chemicals less dusting. Preferably, the process can be used on a broad range of solid leather treatment chemicals, such as on powdered enzymes to reduce dusting during handling in the bating step of the leather making process, and on powdered tanning chemicals such as chromium sulphate or vegetable extracts to reduce dusting during handling in the tanning step of leather making.

In another aspect, it is an object of the present invention to provide a solid, non-dusting composition intended to be dissolved or dispersed directly into a predetermined amount of water and then used as a retanning agent in the wet end treatment of leather, which composition does not essentially require the presence of a fatliquoring agent or other ingredient to render the composition substantially non-dusting.

In another aspect, it is an object of the present invention to provide a substitute for an anti-dusting oil, which substitute does not contribute to fogging in a leather.

In accordance with the present invention there is provided a method of preparing a composition for treating leather, which method comprises adding a predetermined amount of a solid particulate leather treatment composition into a predetermined amount of aqueous diluent or carrier in a vessel at a tannery which solid particulate composition comprises 0.1 wt % or more based on the total weight of said particulate composition of a particulate hygroscopic material; and dissolving or dispersing said solid particulate composition in said aqueous diluent or carrier.

In accordance with another aspect of the present invention, there is provided an article of commerce comprising i) a solid particulate leather treatment composition comprising 0.1 wt % or more based on the total weight of said particulate composition of a particulate hygroscopic material; ii) packaging suitable for receiving, transporting and storing said solid particulate composition without exposing said solid particulate composition to moisture and; and iii) instructions for the handling of said solid particulate composition at the tannery, including instructions for dissolving or dispersing a predetermined amount of said particulate composition directly into a predetermined amount of aqueous diluent or carrier in a vessel. In one embodiment, where the packaging is soluble in aqueous environments or readily destroyed by the mechanical action of the tanning mill, the article of commerce is added directly to the water or other aqueous diluent or carrier in the tanning mill.

In accordance with another aspect of the present invention, there is provided the use in the preparation at a tannery of an aqueous composition for treating leather, such as a bating, tanning, retanning or dying composition, of a solid particulate leather treatment composition comprising 0.1 wt % or more based on the total weight of said particulate composition of a particulate hygroscopic material.

In accordance with another aspect of the present invention, there is provided a process of rendering a solid, dusting leather treatment composition non-dusting, which method comprises admixing a particulate solid, dusting leather treatment composition with a particulate solid hygroscopic material to form an admix, which hygroscopic material is present in said admix in an amount of at least 0.1 wt % based on the total weight of said admix.

In accordance with another aspect of the present invention, there is provided the use of a hygroscopic material as an anti-dusting agent in a solid particulate leather treatment composition. In one embodiment of this aspect, there is provided the use of a hygroscopic material as a substitute for an anti-dusting oil in a solid, particulate leather treatment composition to reduce the number of components which contribute, undesirably, to fogging properties in the end leather.

Preferably, the aqueous diluent or carrier is water which may optionally comprise a solution or dispersion of other leather treatment chemicals.

Reference to a solid, particulate leather treatment composition herein means a composition in a solid particulate form, which particles may be dissolved or dispersed in an aqueous diluent or carrier, such as water, to form an aqueous composition which is suitable for the treatment of leather. It will be recognised that the undissolved or undispersed, dry, solid particles as supplied in conventional packaging are not per se suitable for treatment of leather.

Surprisingly, it has been found that powdered compositions comprising even very low quantities of hygroscopic materials can be non-dusting when exposed to an humid environment, such as that environment typically found in a tannery. If the hygroscopic material is a retanning agent, the invention advantageously enables the leather processor to use solid retanning agents which are not admixed with a predetermined amount of fatliquoring agent, thereby the leather processor can retain the ability to change process reaction conditions at the tannery as well as potentially benefiting financially from reduced transport costs. If the hygroscopic material is used as a substitute for an anti-dusting oil, such as mineral oil, in a solid dye composition, this reduces the number of components in the end leather which contribute, undesirably, to fogging properties in, for example, automotive or airplane leathers.

Preferably, the non-blended, dry (as supplied to the tannery) particulate hygroscopic material is capable of absorbing at least 5%, more preferably at least 10%, by weight water based on the dry weight of said hygroscopic material in 18 hours from an atmosphere having a Relative Humidity of 50% at 25° C.

The hygroscopic material may be organic or inorganic. Preferably, the hygroscopic material is an organic hygroscopic polymer comprising 50 wt % or more, preferably 75 wt % or more, more preferably 100 wt %, of polymerised units of an acidic or basic monoethylenically unsaturated monomer or a mixture thereof such as polymers of acrylic acid. Preferably, said monoethylenically unsaturated monomer is selected from the group consisting of acrylic acid, methacrylic acid, itaconic acid, fumaric acid, maleic acid and anhydrides of such acids; acid substituted (meth) acrylates such as, for example, phosphoethyl (meth)acrylate and sulphoethyl (meth)acrylate; acid substituted (meth) acrylamides such as 2-acrylamido-2methylpropylsulphonic acid; and basic substituted (meth)acrylates and (meth) acrylamides such as amine substituted (meth)acrylates including dimethylaminoethyl(meth)acrylate, tertiarybutyaminoethyl (meth)acrylate and dimethylaminopropyl(meth) acrylamide; their basic salts, and mixtures of such monomers. The more preferred monomers are selected from the group consisting of acrylic acid, methacrylic acid, itaconic acid, fumaric acid, maleic acid and anhydrides of such acids; acid substituted (meth)acrylates such as, for example, phosphoethyl (meth)acrylate and sulphoethyl (meth)acrylate, their basic salts and mixtures of such monomers. The most preferred monomers are acrylic acid, methacrylic acid, maleic acid, anhydrides of such acids, basic salts of such monomers and mixtures of such monomers. In one embodiment the polymeric hygroscopic material is a homopolymer. In one embodiment, the most preferred homopolymer is polyacrylic acid and in another embodiment, the most preferred copolymer is a polymer of acrylic and maleic acids. If the polymer is a copolymer comprising monomers in addition to one or more of the acidic and basic monomers recited above, the additional co-monomer is preferably selected from the group of monomers consisting of ($C_1$–$C_8$) alkyl (meth)acrylates. The polymer preferably has a weight average molecular weight from 1,000 to 250,000, more preferably 1,000 to 100,000. Examples of inorganic hygroscopic materials include dry sodium sulphate and sodium chloride.

The hygroscopic materials, such as polymers of acrylic acid, can be prepared in a solid form, such as a powder or granule, by a conventional process, such as by spray drying. Traditionally, solid polyacrylic acid has been used, for example, in the preparation of detergent formulations, such as in dish-washing and clothes-washing compositions. If exposed to a humid atmosphere, solid polyacrylic acid initially becomes tacky and then, in time, eventually turns into a viscous liquid. This inherent hygroscopic property surprisingly has been found to be a practical advantage in the humid environment of a tannery: where a dust problem may otherwise be envisaged with handling dry polymer particles, the dry particles of polyacrylic acid and the blends thereof surprisingly absorb moisture from the atmosphere in the tannery so rapidly that the fine, dust-forming particles adhere together or to larger particles and so either do not form a dust or reduce the amount of dust formed.

In practice, the time from first exposing the particulate hygroscopic polymeric retanning agent to the humid atmosphere in the tannery to the point where the particulate retanning agent is added to the water to form the aqueous retanning composition is sufficiently short such that the retanning agent only absorbs an amount of moisture from the atmosphere for it to become a moist powder. However, it will be recognised that, if left exposed for too long in the humid atmosphere before use, the particulate retanning agent may absorb too much moisture from the atmosphere for it to be easily handled.

The hygroscopic material is present in the solid leather treatment composition in an amount of at least 0.1 wt % based on the total weight of said composition. Preferably the hygroscopic material is present in the solid composition in an amount of at least 0.5 wt %, more preferably in an amount of at least 1 wt %.

In one particular embodiment of the present invention, the solid particulate composition comprises 50 wt % or more based on the total weight of said particulate composition of a particulate organic hygroscopic polymeric retanning agent. Preferably 75 wt % or more, more preferably 100 wt %, of the solid particulate composition is comprised of said organic hygroscopic retanning agent. A suitable retanning agent in this embodiment is polyacrylic acid.

Preferably, the vessel into which the solid composition and the aqueous diluent or carrier are mixed together is a tanning mill, though the composition and aqueous diluent or carrier may be pre-mixed together in a blending vessel before addition to the tanning mill. It is not important as to whether the composition is added to the aqueous diluent or carrier or the aqueous diluent or carrier added to the composition.

In some embodiments, the solid particulate composition comprises one or more components in addition to the hygroscopic material. For example the composition may comprise one or more of the following: enzymes; tanning agents such as chrome sulphate or vegetable extracts e.g. Quebracho; retanning agents; sulfated and sulfited fatliquors and polymeric softening agents; neutralizing agents, such as sodium acetate, sodium or ammonium bicarbonate; fire retardants, such as trishydroxymethylphosphine; carriers, such as flour, clay, silica, zeolites, wood dust; colourants, such as anionic and cationic dyestuffs, and pigments. These additional components themselves may be hydrophilic or hydrophobic in nature. In any event, the presence of sufficient hygroscopic material in the solid composition will render the particulate composition non-dusting.

In yet another embodiment, the present invention provides the use of a solid, hygroscopic polymer as a substitute for an anti-dusting oil in a leather dye composition. Preferably, the hygroscopic polymer also acts as a retanning agent. Preferably, the dyes are selected from the group consisting of anionic, and basic dyes plus colorants and pigments in general.

The invention in various embodiments will now be further described in the following worked examples:

Experimental

All solid, particulate materials were used as commercially supplied i.e. dry. They were transferred from their packaging to airtight containers, and quickly sealed to minimize their uptake of atmospheric moisture.

The hygroscopic susceptibility of the solids were measured in a room having a constant temperature (25° C.) and constant relative humidity (50%) (hereafter abbreviated CTHR). An open Aluminum pan was weighed (~1.3 grams), and the solid (~3.5 grams) was then added. The open Aluminum pan containing the solid was put in the CTHR for 18 hours and then re-weighed. The % Moisture Uptake of the solid was calculated as equal to: 100×(Final weight of the solid—Initial weight of the solid)/Initial weight of the solid.

The Relative Dusting Susceptibility of the solid powders was determined by one of two visual methods. In one method, the powder, either conditioned in the CTHR or not, was sealed in a 28 g glass vial. It was excited with a kinetic energy impulse from a tap/jolt using the forefinger (hereafter called Tap Dust Method) to generate a dust turbulence in the head space above the solid. The amount of airborne solid, and the persistence of its fine powder in the air void was then used to determine the relative dusting susceptibility. The larger the amount of the solid in the turbulent dust and the longer it persisted as a cloud, the worse it was rated for dusting. In our visual rating, a low or minimal dusting was given a numerical rating of 0. The highest level of undesirable dusting was given the numerical rating of 5. In another method, shaking by hand (hereafter called the Shake Dust Method) was used to create a dust turbulence. The powder, 100 grams in an 224 g. glass jar, was shaken by hand 5 times back and forth and the solid allowed to settle. The susceptibility of the solid to dust was taken to be proportional to the time it took the fines in the head space above the solid to settle and clear. A longer time for the dust to settle was given a high number equal to a poor rating (i.e. 5) on the same evaluation scale as was used in the first method. Large samples were used when very small percentage levels of Polyacrylic acid were being mixed with the powder products. The Shake Dust Method was preferred when using large samples of mixture, simply because such large samples could not be practically excited to generate dust turbulence by the Tap Dust Method. The results are given in Table 1.

Comments for Table 1

Powder Product: Quebracho is a tanning material of a natural botanical origin. TANIGAN® OS and BAYKANOL® TF-2N are synthetic replacement tanning agents supplied by BAYER AG.

Polyacrylic acid. Two commercially available Polyacrylic acids were used, and were designated A and B. Polyacrylic Acid A is a homopolymer of acrylic acid of molecular weight (Mw)=4,500 Daltons and is fully neutralized with sodium hydroxide. Polyacrylic Acid B is a copolymer of 80 weight parts acrylic acid, and 20 weight parts of maleic acid having an Mw=20,000 Daltons, and 100% neutralized with sodium hydroxide.

% Polyacrylic acid in mixture. When referring to blends of the powder product with Polyacrylic acid A, and B, the amount of the relevant Polyacrylic acid quoted in the mixture is a weight %.

Method of mixing Grinding is a well established method to reduce particle size and increase surface area. The grinding was done by using a mortar and pestle for 10 minutes. When grinding was done on several components simultaneously, a homogeneous blend was obtained. When grinding was not used, the mixture components were shaken by hand for a minute in a sealed glass container (28 g or 224 g) to make a homogeneous blend.

Weight % Moisture Uptake. This was measured as described above in the Experimental Section.

Relative Dusting Susceptibility. This was visually rated as described above in the Experimental Section. All the dusting ratings used in Table 1, except for Examples 7, 8, 14, and 15, were determined by the Tap Dust Method.

TABLE 1

The Hygroscopic, and Relative Dusting Susceptibility of Polyacrylic Acids and their Mixtures with Other Leather Products in Powdered Form.

| Example | Powder Product | Commercial Polyacrylic Acid | % Polyacrylic Acid in Mixture | Method of Mixing | Relative Dusting Susceptibility Without Conditioning in CTHR | % Moisture Uptake in CTHR |
|---|---|---|---|---|---|---|
| 1 | None | A | 100 | | 0 | 23.6 |
| 2 | None | B | 100 | | 0 | 16.3 |
| 3 | Quebracho | None | 0 | | 1 | 0 |
| 4 | TANIGAN ® OS | None | 0 | | | 4.0 |
| 5 | Quebracho | None | 0 | Grind* | 3 | |
| 6 | Quebracho | A | 19.5 | Grind | | 8.1 |
| 7 | TANIGAN ® OS | None | 0 | | 3 (Shake) | |
| 8 | TANIGAN ® OS | A | 1 | Shake | 2 (Shake) | |
| 9 | TANIGAN ® OS | None | 0 | Grind* | 4 | |
| 10 | TANIGAN ® OS | B | 11.1 | Grind | 3 | |
| 11 | TANIGAN ® OS | B | 11.6 | Grind | | 4.7 |
| 12 | TANIGAN ® OS | A | 20.0 | Shake | 1 | |
| 13 | TANIGAN ® OS | A | 20.0 | Grind | 2 | |
| 14 | BAYKANOL ® TF-2N | None | 0 | | 3 (Shake) | |
| 15 | BAYKANOL ® TF-2N | A | 0.5 | Shake | 2–3 (Shake) | |

TANIGAN ® and BAYKANOL ® are registered trademarks of BAYER AG.

*Although examples #5 and #9 are not mixtures, they were ground before measuring their Relative Dusting Susceptibility.

EXAMPLES

Example 1 and 2 show the hygroscopic and low dusting susceptibility without conditioning in the CTHR of Polyacrylic acids A and B of this invention respectively. Polyacrylic acid A of example 1, and Polyacrylic acid B of example 2, both as supplied, absorbed 23.6%, and 16.3% atmospheric moisture respectively when placed in the CTHR for 18 hours.

Examples 3 and 4 show two non-hygroscopic materials which as supplied absorbed less than 5% atmospheric moisture when placed in the CTHR for 18 hours. Their dusting after conditioning in the CTHR is reported.

Example 5 shows that Quebracho, which has a relatively coarse particle size, became significantly more dusting when ground when compared with example 3.

Example 6 shows that adding Polyacrylic acid A as supplied to Quebracho of example 5, gave a blend of greatly reduced dusting susceptibility as tested after grinding the mixture and conditioning it in the CTHR.

Example 7 shows that TANIGAN® OS, as supplied, had a high dusting susceptibility.

Example 8 shows that adding Polyacrylic acid A as supplied and with out conditioning in CTHR, to TANIGAN® OS of example 7, gave a blend of reduced dusting susceptibility.

Example 9 show that grinding TANIGAN® OS gave it a higher dusting susceptibility.

Example 10 shows that adding Polyacrylic acid B as supplied to the powder of example 9, gave a blend of reduced dusting susceptibility.

Example 11 shows that when the powder of example 10 was additionally conditioned in the CTHR, it absorbed 4.7% moisture which resulted in a further reduction of its dusting susceptibility.

Example 12 and 13 show that adding Polyacrylic acid A, as supplied and without conditioning in the CTHR, to the powder of example 9, gave blends of significantly reduced dusting susceptibility regardless of whether the mixtures were mixed by shaking or grinding.

Example 13 shows that grinding the powder of example 12, worsened its relative dusting susceptibility.

Example 14 shows that BAYKANOL® TF-2N as supplied had a high dusting susceptibility.

Example 15 shows that adding Polyacrylic acid A to BAYKANOL® TF-2N of example 14, gave a blend of reduced dusting susceptibility.

Treatment of Leather

General

All retanned leathers were prepared from heavyweight (thickness varying in the range of 1.9 to 2.3 mm) shaved wet blue, chrome tanned bovine leather. The retanning step was conducted in matched tanning drums manufactured by Dose Maschinenbau GmbH, which were specifically designed for wet-end leather procedures. These heated, rotating, stainless steel drums had a volume of about 400 liters.

All the weights used during the retanning or subsequent steps, such as coloring, and fatliquoring, were based on the relative weight of the wet, wrung and shaved blue stock (chrome tanned leather) in a tanning mill. For example, a 100 percent float was a weight equal to that of the wet blue used, and a 200% percent float was a weight of float equal to twice the weight of the wet blue hide being retanned.

Shoe Upper Application of Polyacrylic Acid A.

The following experiment was used to assess the relative performance of leather made with as supplied spray-dried Polyacrylic acid A of this invention, versus the commercial liquid precursor. A wet blue side, (1.9–2.3 mm. thickness) was cut into 3 roughly equally-sized strips, and each labeled Neck (N), or Middle (V), or Butt (X) to indicate its relative location on the side. Each strip was further cut into 3 strips and each labeled 1, or 2, or 3 to give the general side label of (N1N2N3) (V1V2V3) (X1X2X3). One strip from each region was then selected at random for treatment with Polyacrylic acid A, and its commercial liquid precursor. Wet blue strips labeled N1V3X2 of weight basis equal to 100 weight %, were offered 2% solids of the spray dried Polyacrylic acid A in a tanning mill. Strips N3V2X1 were treated in a second matching tanning mill with 4.4% of the liquid precursor to the spray dried product Polyacrylic acid A. This liquid version had a 45% total solids, and hence its attendant strips were offered 2% net solids equivalent like used in the previous set for Polyacrylic acid A.

The details of this experiment were as follows. The wet blue strips above, were put in the tanning mill, and were given a wash with water at 35° C. for 5 minutes with the mill door partly open. After washing, 100% float was added to the tanning mill, and the indicated strips were neutralized with 1% sodium formate and 0.5% sodium bicarbonate for 45 minutes drumming time. The neutralized blue stock was then given a wash with water at 35° C. for 5 minutes with the mill door partly open. After draining, the strips were separated according to the selected strip code above. Each set of three strips was put in its tanning mill. A 100% float was added to the strips encoded N1V3X2, and they were offered 2% of the solid Polyacrylic acid A used therein as a retanning agent. The commercial liquid precursor to the spray dried Polyacrylic acid A., (4.4%) was dissolved in 100% float and then added to its tanning mill used also as a retanning agent. Drumming of the leather was continued for one hour. To each tanning mill was then added 0.5% of BAYGENAL® BROWN CGG anionic dyestuff, and the drumming continued for an extra hour (BAYGENAL® is a registered trademark of BAYER AG.). At the end of this time, 0.5% formic acid (88% purity) was added to each tanning mill to lower the pH of its attendant float to 4 in preparation for the following fatliquoring step. After drumming for 10 minute, the tanning mills were drained, and the leather in each washed with water at 50° C. for 5 minutes with the mill door partly open. At this point in the process, 6% of a commercially available sulfated fatliquor, was first dispersed with stirring in 100% float at 50° C., and then added to its attendant tanning mill. After drumming the mixture for 1 hour, 0.5% formic acid was added to each tanning mill in order to clarify remnant fatliquor from the float. The leather in each mill was next washed for 5 minutes at 35° C. with the mill door partly open. After draining, the leather was horsed overnight. It was vacuum dried (<0.04 Bar) for 3 minutes at 46° C. The leather was aired off overnight. Finally, it was mechanically softened by staking in preparation for evaluation.

The performance of the resultant leather was evaluated for the subjective properties of softness, fullness, and the intensity and leveling of the dyestuff. The performance of the leather made with spray-dried Polyacrylic acid A was found to be essentially similar to the leather prepared by using the commercial liquid precursor of Polyacrylic acid A.

Fog Performance of Low Dusting Solid Mixtures of Dyestuff and Polyacrylic Acids.

Car makers require that car interiors have a low fogging susceptibility. Upholstery materials are a well known source of fog. Fog is a residue generated under the influence of heat from the vehicle's upholstery (e.g. leather, fabric, or vinyl), and then condensed on the inside of the vehicle's windows. This fog is undesirable. First, fog on the windshield will diminish or blur the drivers' visibility, especially at night. If the fog is oily, it will capture dust brought in the passenger compartment, and will further degrade visibility. Secondly, the fog components can be necessary for the optimal performance of the parent upholstery. For example, the continued loss of plasticizer as fog from vinyl upholstery will make it brittle, weak, and susceptible to cracking.

Tanners who make vehicular leather, and their suppliers of processing materials, have become cognizant over the past decade of the key factors which affect the fogging performance of leather. One such factor is solid dyestuff bearing mineral oil used therein as an anti-dust agent to minimize the dyestuffs' health hazard to tannery workers by the route of inhalation. The mineral oil will be retained in the leather during wet end processing; but will readily evolve from the leather as fog under the testing conditions of Test Methods DIN 75201, and SAE J1756. One remedy to this problem is to supply dyestuffs in liquid form without the dusting hazards. This has its own disadvantages including a greater susceptibility of the dyestuff to hydrolytic degradation, and increased transportation costs. The anti-dusting effect of a hygroscopic material such as polyacrylic acid as described in this invention will overcome the performance and handling limitations of the classical dyestuff mixtures mentioned above. The novel dye mixtures of this invention will be solid, will not contain mineral oil, will have excellent chemical and shelf stability, and the polyacrylic acid embodied in the mixture will not add fogging components beyond the levels inherent in the leather substrate, and from the parent dyestuff if any.

We claim:

1. A method of rendering a solid, dusting leather treatment composition non-dusting, comprising the step of admixing a particulate solid, dusting leather treatment composition with a particulate hygroscopic material to form an admix, wherein said admix comprises at least 0.1 weight % particulate hygroscopic material.

2. A method of preparing an aqueous composition for treating leather, comprising the steps of:

a) preparing a solid particulate leather treatment composition comprising a particulate solid, dusting leather treatment composition and at least 0.1 weight % particulate hygroscopic material, based on weight of said solid particulate leather treatment composition; and b) dissolving or dispersing said solid particulate leather treatment composition in an aqueous diluent or carrier.

3. A method of treating leather comprising the steps of:

a) preparing a solid particulate leather treatment composition comprising a particulate solid, dusting leather treatment composition and at least 0.1 weight % particulate hygroscopic material, based on weight of said solid particulate composition;

b) dissolving or dispersing said solid particulate composition to an aqueous diluent or carrier to provide an aqueous composition for treating leather; and c) contacting said aqueous composition for treating leather with leather.

4. The method according to claims 1, 2, or 3, wherein said particulate hygroscopic material is an organic hygroscopic polymer comprising as polymerized units, at least 50 weight % acid or basic monoethylenically unsaturated monomer or a mixture thereof.

5. The method according to claim 4, wherein said acidic or basic monoethylenically unsaturated monomer is selected from the group consisting of acrylic acid, methacrylic acid, itaconic acid, fumaric acid, maleic acid, and anhydrides of such acids; acid substituted (meth)acrylates, acid substituted (meth)acrylamides; their basic salts; and basic substituted (meth)acrylates and (meth)acrylamides; and mixtures thereof.

6. The method according to claim 5, wherein said organic hygroscopic material further comprises as polymerized units, from 0 to 50 weight % of at least one co-monomer selected from the group consisting of $(C_1-C_8)$ alkyl (meth) acrylates, based on the weight of said organic hygroscopic material, and wherein said acidic or basic monoethylenically unsaturated monomer is selected from the group consisting of acrylic acid, methacrylic acid, maleic acid, anhydrides of such acids; basic salts of such monomers and mixtures thereof.

7. The method as claimed in claim 6, wherein said organic hygroscopic material is a homopolymer of acrylic acid, a copolymer of acrylic acid comprising as polymerized units at least 50 weight % acid, based on weight of said copolymer, or a basic salt thereof.

* * * * *